Patented June 27, 1950

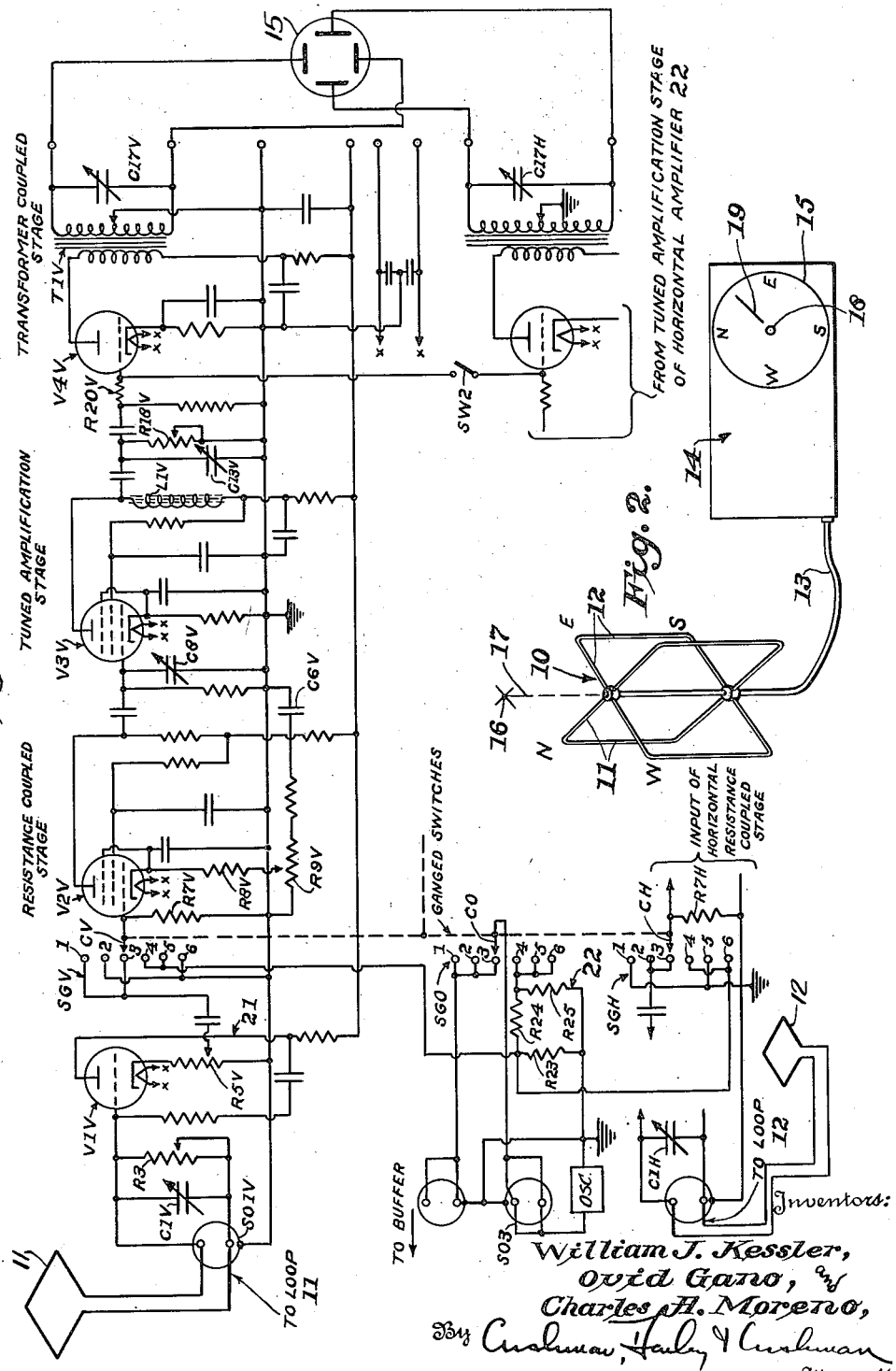

2,512,832

UNITED STATES PATENT OFFICE 2,512,832

TRANSIENT SIGNAL DIRECTION FINDER

William J. Kessler and Ovid Gano, Gainesville, Fla., and Charles A. Moreno, Queens Village, N. Y., assignors to the Board of Commissioners of State Institutions of the State of Florida Application January 12, 1948, Serial No. 1,788

4 Claims. (Cl. 343—113)

The present invention relates to transient signal direction finders.

This application is a continuation-in-part of our application Serial No. 777,416, filed October 2, 1947, for Direction Finder, now abandoned.

In order to locate atmospheric disturbances, as well as to obtain a bearing on any radio transmitter, it has been customary to provide a direction finding apparatus comprising loop antennae arranged in planes normal to each other, together with the necessary circuits whereby an impulse received on the antennae will appear as a trace on a cathode ray tube screen.

One difficulty in the use of the above-described apparatus arises from the fact that there may be slight differences in the components of the amplifying circuits which are provided between each antenna loop and the cathode ray tube. As a result, the circuit including one loop may not be tuned like the other circuit, or one circuit may produce an output signal which is not in phase with the output signal of the other circuit. Either situation results in an inaccurate indication on the cathode ray tube screen.

Objects of the present invention are to provide a direction finder including means to permit testing and adjustment of the circuits to maintain their output signals in phase with each other and also to permit each circuit to be properly tuned.

Other objects and advantages of the invention will be apparent from the accompanying drawing and following specification wherein:

Figure 1 is a diagram of a circuit including the present invention, and

Figure 2 diagrammatically illustrates the direction finder and particularly the loops and cathode ray tube or oscilloscope.

Figure 2 indicates the usual type of direction finding antenna 10 including a north-south loop 11 and an east-west loop 12. These loops are respectively connected to the circuits hereinafter described, by a suitable cable 13 leading to a control cabinet generally designated 14. An oscilloscope unit 15 is included in the cabinet 14.

As is customary in the operation of such an apparatus, the loops 11 and 12 lie in vertical planes at right angles to each other with the north-south loop oriented in those directions. In the event an atmospheric disturbance creates static at a point 16 directly northeast of the antenna 10, the resultant electromagnetic radiation will act upon the loops 11 and 12 along the line 17, i. e., along a line which is at an angle of 45° to both loops. With the screen 15 provided with protractor markings, the resultant signal imposed on the apparatus will cause the cathode beam normally appearing at the point 18 on the screen to be shifted so that a line 19 will appear on the screen. This line is formed by the rapidly moving cathode ray beam and indicates the true direction of the atmospheric disturbance from the station. It will be understood that the voltage impressed upon the loops 11 and 12 acts upon the deflecting plate of the cathode ray tube to thereby deflect the cathode beam from its normal position indicated at 18 to form the line 19. An apparatus of the type under discussion is usually tuned to some low frequency of the order of 10 kilocycles in order to provide a reasonable voltage output as well as selectivity and to eliminate interference from low frequency commercial code stations.

The actual voltage output of a tuned antenna is not a replica of the static crash but, instead, is a damped sinusoidal wave. If the damped waves from the two loops are amplified without distortion, or at least with identical distortion, a sharp, straight line will appear at 19 on the oscilloscope 15.

The damped waves from the two loops must be amplified without distortion, or with identical distortion, in order to produce a sharp line on the cathode ray tube. Otherwise, the desired sharp line will not appear on the oscilloscope screen but, instead, a distorted elliptical line will appear, making it very difficult to determine the compass direction that the line is supposed to indicate. The present invention includes means to permit adjustment of the various components of the amplifying circuits so that both circuits will produce output signals which are in phase. It also permits the amplifying circuits to be correspondingly tuned for optimum results.

Referring now to Figure 1, this figure diagrammatically illustrates the amplifying means used with the apparatus of Figure 2 for the purpose of amplifying the signals received on the antenna 10. As is diagrammatically illustrated in Figure 1, the north-south loop 11 will be connected to the input end or left-hand end of the upper circuit 21 illustrated in Figure 1 while the east-west loop 12 will be connected to the left-hand end of the lowermost circuit 22 of the figure. The amplifying circuit for each loop is identical and, therefore, Figure 1 completely illustrates only the circuit 21 which is connected to the north-south loop 11. Such portions of the amplifying circuit 22 connected to loop 12 as are omitted from Figure 1 are identical with the corresponding portions of the circuit 21 illustrated in the upper portion of Figure 1. It will be understood that the output ends of thte circuits 21 and 22 (the right-hand ends of the circuits in Figure 1) will be suitably connected to the usual power supply and to the oscilloscope circuit as is indicated in Figure 1.

The amplifying circuit 21 for the north-south loop 11 controls the vertical deflection plates of the cathode ray tube 15. Therefore, that circuit may be regarded as the vertical plate circuit and the reference characters used in connection with that circuit terminate in the letter "V." The circuit 22 of the east-west loop 12 controls the horizontal deflection plates of tube 15 and the reference characters of the latter circuit therefore terminate in the letter "H." Such reference characters as do not terminate in either of the letters "V" or "H" refer to parts not used in both circuits.

Referring to the circuit 21, the output of the loop 11 is connected to the amplifying circuit 21 through a socket SO1V. The loop being an inductance, the voltage which it applies to the amplifying circuit may be increased by tuning the loop to resonance at the desired frequency by operation of condenser C1V mounted across the loop. A resistor R3V is also mounted across the loop and in parallel with the condenser C1V. The purpose of this resistor is to provide an adjustment whereby the operator can give the two loops identical characteristics. It will be understood that the provision of a variable resistor such as R3V across the output of each loop circuit will enable their "Q" value to be suitably matched. As is well known, the "Q," or "Q" value, of a tuned circuit is a measure of the sharpness of tuning. It usually is defined as the ratio of inductive reactance to series resistance at resonance or as ratio of shunt resistance to inductive reactance.

The loop output is coupled to a vacuum tube circuit of the cathode-coupled type designated V1V. This circuit gives stability and prevents the tube from loading the high impedance loop circuit. In addition, the low impedance in the output of the cathode-coupled circuit reduces phase shift. In other words, the tube V1V comprises a device to couple the loop to the remaining amplifying elements of the amplifying circuit 21. The amount of coupling can be varied by adjusting resistor R5V. Because the center of the loop will be grounded, only half of the voltage developed by the loop is applied to V1V. V1V gives a voltage amplification of slightly less than 1. The grid resistor R4V is large, its only function being to prevent the grid from becoming completely free from ground if the loop circuit is open.

From V1V, the signal goes to two contacts of a group SGV of fixed contacts. Group SGV is one of three groups of contacts, the other two groups being designated SGO and SGH, respectively. As will be hereinafter explained, each of these three groups has associated therewith a moving contact forming part of a gang switch so that all of the contacts can be operated together.

In the normal operation of the apparatus, the moving contact CV associated with contact group SGV will be in the position illustrated in Figure 1. As a result, the signal from V1V will be carried to the grid of tube V2V forming part of the resistance-coupled amplification stage. This stage serves as the gain control for the amplifier, the gain being controlled by varying the cathode bias. Resistor R9V is the gain control and provides a variable positive voltage on the cathode. In order to prevent V2V from ever operating at high bias, cathode resistor R8V provides a small amount of self bias. Condenser C8V is adjustable to correct phase shifts in the stage including V2V. Condenser C8V and the corresponding condenser in the horizontal plate amplifying circuit 22 provide an infinite number of possible combination of settings which will produce the required phase characteristics. However, best operation is obtained by having the smallest possible value of capacitance. Therefore, one of these two condensers should be set to minimum and the required adjustment made with the other.

From the resistance-coupled stage including tube V2V, the signal is applied to a stage V3V of tuned amplification. The tube in this stage provides the amplification and the inductor L1V and condenser C13V make up the tuned circuit. As in the case of the tuned loop circuit, this tuned circuit must be provided with means for adjusting the sharpness of tuning or "Q" of the circuit. This is accompanied by a high variable value of shunt resistance afforded by the resistor R18V. It will be observed that condenser C13V is in shunt with the output of V3V and that R18V is in parallel with the variable condenser just mentioned. The stage V3V of tuned amplification provides additional selectivity over that afforded by the tuned loop, and helps prevent interference from low frequency high-powered transmitters.

From the stage including V3V, the signal is then applied to a transformer coupled stage including tube V4V and transformer T1V. A series resistor R20V is employed in the grid circuit of this stage to prevent the stage from oscillating as a tuned grid, untuned plate, oscillator. The primary of transformer T1V is in the output of V4V and its secondary is connected to the respective plates of the pair of vertical deflection plates in the cathode ray tube 15. The variable condenser C17V is connected across the secondary of transformer T1V. Condenser C17V serves as a trimming condenser to correct for manufacturing tolerances of the transformer T1V.

The remainder of the amplifier unit consists of by-pass condensers at various points, with resistance-capacitance filters in each plate circuit to isolate the stages.

As has been stated above, the portion of the horizontal plate circuit 22 which is not illustrated in Figure 1 is identical with the vertical plate circuit 21.

As is shown in Figure 1, a line including a switch SW2 connects the last stage of the two amplifiers. Switch SW2 is normally open but is closed during some testing operations, as is hereinafter described.

The manner in which the circuits described above will normally operate to indicate the direction from the station of an electrical impulse will be clear from the above description of the circuit and the operation described in the opening portion of this specification. The invention is particularly designed to enable the signals upon the plates of the oscilloscope 15 to be sharply tuned in both circuits 21 and 22 and also to prevent phase differences between the two circuits. This is accomplished by adjustments made in the circuit and which adjustments are decribed below.

In order to align or test the amplifying circuits and, during such tests, place them in properly tuned relation and correct for differences in phase, the two circuits 21 and 22 are adapted to be connected through a socket SO3 to an oscillator, not shown. The oscillator, as well as a buffer tube, not shown, are connected in the circuits 21 and 22 by operation of the ganged moving contacts CV, CO, and CH. As has been stated above, moving contact CV is associated with a group of fixed contacts SGV associated with the vertical deflection plate circuit 21. Moving contact CO is associated with the group SGO of fixed contacts associated with the oscillator circuit and moving contact CH is associated with the group SGH of fixed contacts associated with the circuit 22 which amplifies the current delivered to the horizontal deflection plates of the oscilloscope 15. The manner of connecting the group of contacts SGO and the corresponding moving contact CO to the oscillator is illustrated in Figure 1.

It will be observed that a resistance network R23, R24 and R25 is provided to provide attenuation of the calibration oscillator signal during the testing or alignment of the apparatus.

Each group of fixed contacts includes six contacts designated 1 to 6. As has been stated above, when the moving contacts CV, CO and CH are in the position illustrated in Figure 1, i. e., in engagement with contact 3 of the respective groups, the apparatus is in normal operation to transmit a signal received on the antenna 10 to the oscilloscope 15.

When it is desired to test the amplifying circuits, the oscilloscope beam would be adjusted until a small spot appears at the center of the oscilloscope screen, all amplifier gain controls then being set at minimum value. Then the oscillator would be energized to the desired frequency. The gang switch contacts CV, CO and CH would then be moved into engagement with the contact 6 of each group of fixed contacts. With the moving contacts in this position, the oscillator signal will be fed only to the horizontal amplifier circuit 22. The horizontal tuning control on the oscilloscope would then be adjusted until the horizontal trace on the oscilloscope screen is at a maximum.

Then the ganged moving contacts would be moved to engage the fixed contact 5 in each group of contacts SGV, SGO and SGH. In this position, the oscillator output will be delivered to the vertical plate circuit 21 for the oscilloscope. The tuning control for these plates would then be adjusted until the resultant vertical trace on he oscilloscope screen is approximately the same as that which was obtained for the horizontal trace in the preceding test. Without moving the ganged contacts, the output paralleling switch SW2 will then be closed and the transformer phasing condensers C17V and C17H would be adjusted until the resulting elliptical trace on the oscilloscope screen becomes a straight line. Should maximum capacitance on one of these phasing condensers and minimum capacitance on the other phasing condenser fail to produce a straight line trace, a fixed condenser may be placed in parallel with one of the condensers C17V or C17H. When a satisfactory straight line trace has been obtained, indicating that the output of the two transformers is in phase, switch SW2 will be opened.

Operation of the moving contacts of the ganged switch to respectively engage the contacts 4 of the groups of fixed contacts will result in the oscillator output being delivered to both of the amplifier circuits 21 and 22 in parallel. The tuning, phasing and gain of the circuits 21 and 22 can then be tested, in that order, until the resulting trace on the oscilloscope screen is a straight line inclined at an angle of 45° (as at 19 in Figure 2) over a large range of frequencies. There is a slight interaction between the three adjustments mentioned but the net result of the adjustments should provide a straight line trace of 45° on the screen.

With the moving contacts of the gang switch now moved to engage contact 1 of each group of fixed contacts, the oscillator signal will be fed to loops 11 and 12 but the output of only loop 11 will be delivered to its amplifying circuit. The loop tuning condenser C1V can then be adjusted until a maximum vertical trace is obtained. By varying resistor R3V, the tuning can also be further adjusted. The result of this adjustment should be to obtain a maximum vertical trace consistent with contemporary static conditions in the atmosphere.

A further test is obtained by shifting the moving contacts to engage the fixed contact 2 of each group. In this position, the oscillator signal will be fed to both of the loops 11 and 12 but only the output of the loop 12 will be delivered to its amplifying circuit. Adjustment of condenser C1H will give maximum horizontal trace. The purpose is to obtain a horizontal trace approximately the same size as the vertical trace obtained with the immediately preceding test.

The moving contacts of the gang switch may then be restored to the position illustrated in Figure 1, i. e., in engagement with the fixed contact 3 of each group. However, with the oscillator still in operation, the oscillator signal will be fed to both loops and each amplifying circuit 21 and 22 will be connected to its loop. Any tendency of the trace toward an elliptical form can then be corrected by a slight adjustment of one of the tuning condensers C1V or C1H. The difference in tuning or "Q" of the loops can be adjusted at this time by closing the output paralleling switch SW2. One of the loop gain controls may be adjusted until the resulting straight line trace is at 45°.

The oscillator can now be turned off with the gang switch left at position 3 and the equipment should be ready for normal operation and observation.

The terminology used in the specification is for the purpose of description and not of limitation, the scope of the invention being indicated in the following claims.

We claim:

1. In a transient signal direction finder, a pair of loop antennae, an amplifying circuit for each of the respective antennae, an oscilloscope, the output of each amplifying circuit being connected to the respective pairs of deflecting plates of said oscilloscope, an oscillator, means for attenuating the signal of said oscillator, means for selectively connecting said oscillator to the input of either and both of said amplifying circuits and simultaneously disconnecting said circuits from said loops, and adjustment means for matching the tuning and phase of said amplifying circuits over the entire transmission frequency-range of the direction finder.

2. The invention as defined in claim 1, wherein said adjustment means includes a variable condenser and a variable resistor across each loop at the input end of the amplifying circuit connected thereto, a transformer associated with each of said amplifier circuits, each transformer having its primary in the last stage of the corresponding amplifier circuit, the secondaries of the transformers being connected to the respective pairs of deflection plates of said oscilloscope, and a variable condenser across the secondary of each transformer.

3. In a transient signal direction finder, a pair of loop antennae, an amplifying circuit for each of the respective antennae, an oscilloscope, the output of each amplifying circuit being connected to the respective pairs of deflecting plates of said ocsillocsope, an oscillator, means for attenuating the signal of said oscillator, means for selectively connecting said oscillator to the input of either and both of said amplifying circuits and simultaneously disconnecting said circuits from said loops, means for selectively connecting said oscillator to either and both of said loops, and adjustment means for matching the tuning and phase of said amplifying circuits over the entire transmission frequency-range of the direction finder.

4. The invention as defined in claim 3, wherein said adjustment means includes a variable condenser and a variable resistor across each loop at the input end of the amplifying circuit connected thereto, a transformer associated with each of said amplifier circuits, each transformer having its primary in the last stage of the corresponding amplifier circuit, the secondaries of the transformers being connected to the respective pairs of deflection plates of said oscilloscope, and a variable condenser across the secondary of each transformer.

WILLIAM J. KESSLER.
OVID GANO.
CHARLES A. MORENO.

REFERENCES CITED

The following references are of record in the file of this patent:

UNITED STATES PATENTS

| Number | Name | Date |
|---|---|---|
| 1,780,987 | Snow et al. | Nov. 11, 1930 |
| 2,017,523 | Beers | Oct. 15, 1935 |
| 2,051,898 | Roberts | Aug. 25, 1936 |
| 2,113,395 | Braden | Apr. 5, 1938 |
| 2,164,745 | Kentner | July 4, 1939 |
| 2,195,301 | Grayson | Mar. 26, 1940 |
| 2,208,733 | Roberts | July 23, 1940 |
| 2,238,951 | Smith et al. | Apr. 22, 1941 |
| 2,282,402 | Hefele | May 12, 1942 |
| 2,397,842 | Crosby | Apr. 2, 1946 |

FOREIGN PATENTS

| Number | Country | Date |
|---|---|---|
| 553,618 | Great Britain | May 28, 1943 |